Sept. 12, 1950 C. FANSHIER 2,522,258
TANK GAUGE
Filed Jan. 31, 1947 2 Sheets-Sheet 1
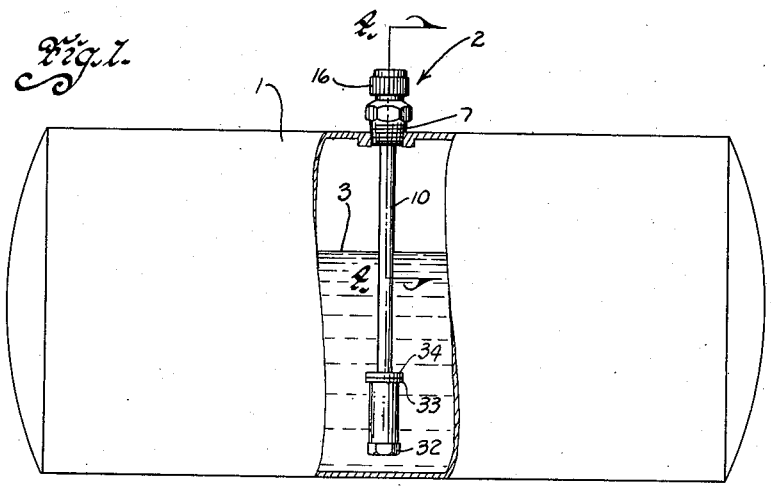
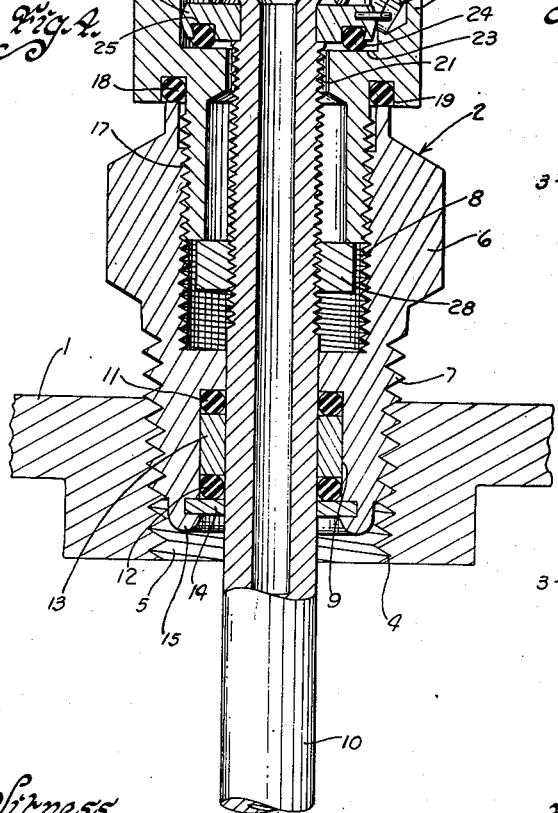
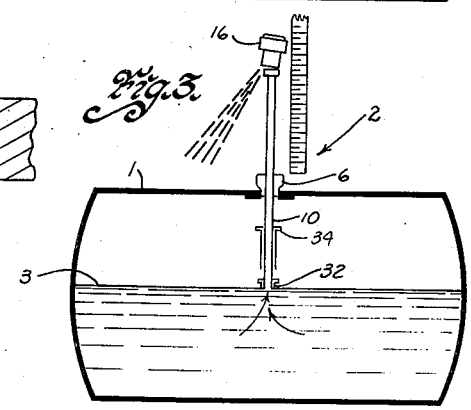
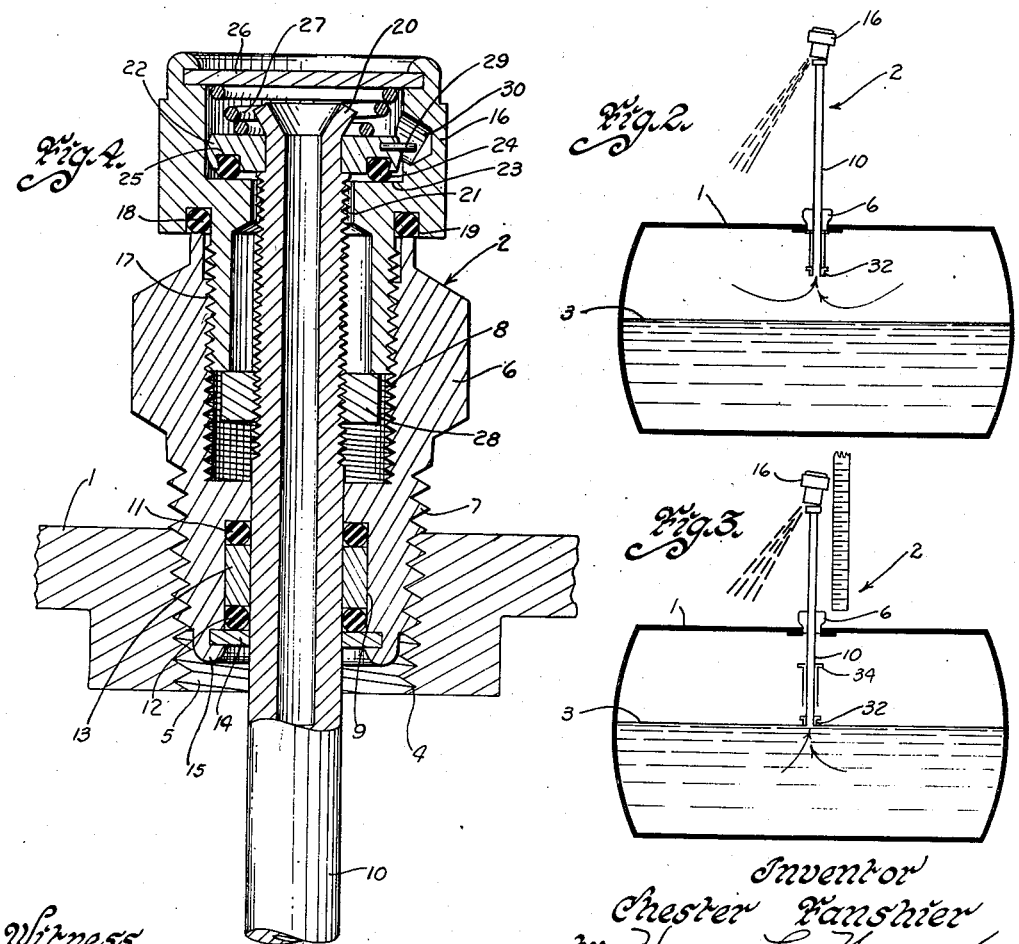
Inventor
Chester Fanshier
By Harry L. Yunger
Attorney
Witness
Edward P. Sedey

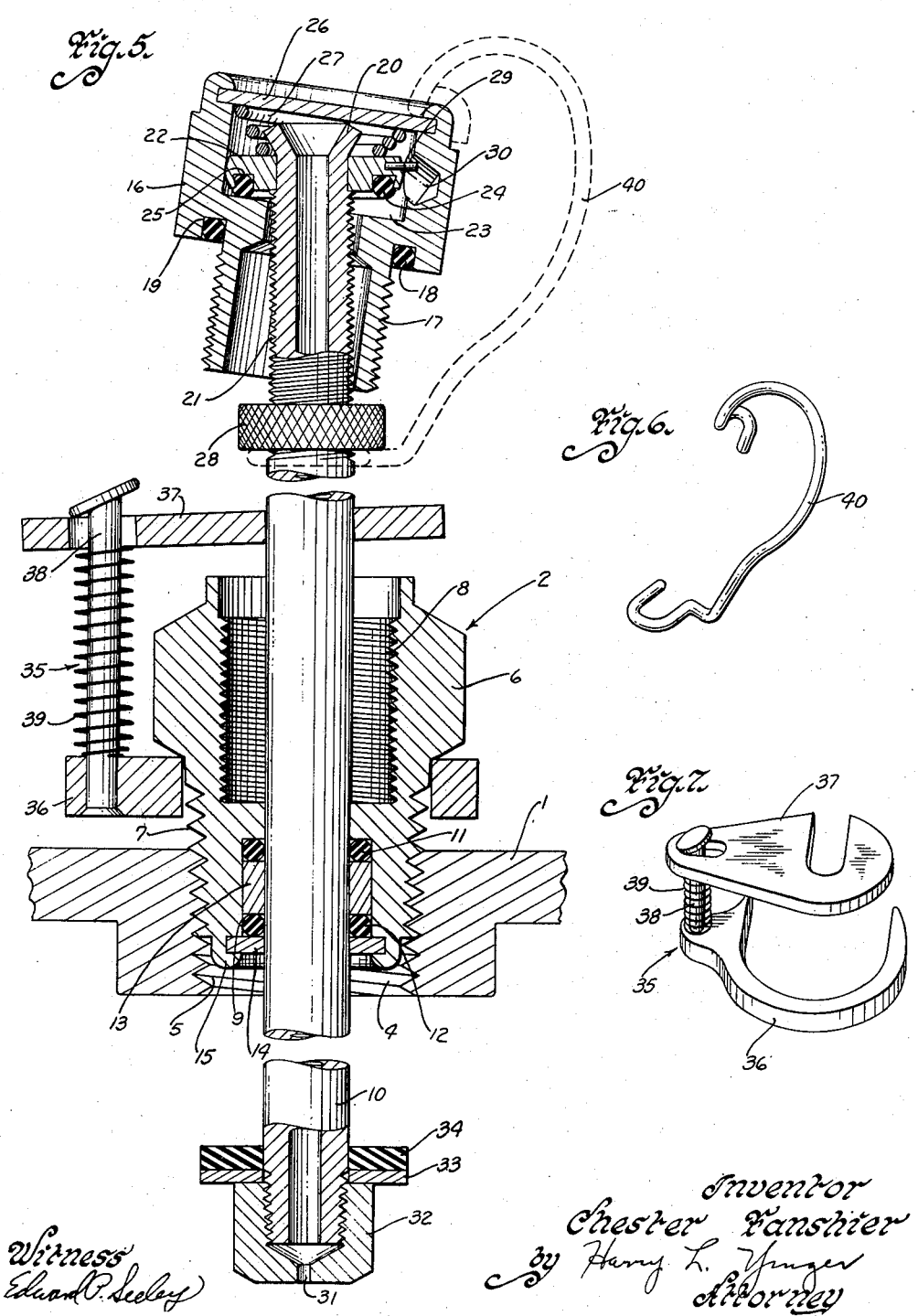

Patented Sept. 12, 1950

2,522,258

UNITED STATES PATENT OFFICE 2,522,258

TANK GAUGE

Chester Fanshier, Bartlesville, Okla.

Application January 31, 1947, Serial No. 725,520

5 Claims. (Cl. 73—298)

This invention relates to a tank gauge for liquified petroleum gases or the like and more particularly to a tank gauge to be used to determine the quantity of liquified petroleum gas or the like in a tank during a filling operation.

Prior to the present invention, there was no tank gauge on the market with an automatic closing feature. When the tank gauge was opened, it remained open until it was closed positively. This meant that, when someone unaccustomed to the hazards of liquified petroleum gases should attempt to use the gauge while smoking or carrying a lantern, the stream of gas or liquid might catch fire, and the fire would continue burning because of the difficulty in closing the valve while the fire was in progress. With the automatic closing feature, if a fire occurs while the gauge is open and the operator is forced away from the gauge, the valve would close automatically and shut off the fire. This will reduce fire hazard to a minimum during filling operations.

It is an object of the invention, among others, to provide a tank gauge that will give an indication of the amount of a volatile liquid in a tank with the said tank gauge automatically closing when an operator leaves the gauge; a tank gauge that reduces the fire hazard to a minimum during filling operations for liquified hydrocarbon gases into a tank; a tank gauge that is simple and economical in construction and durable and long lasting in operation; a tank gauge that is simple for an operator to operate; and a tank gauge easy to install.

In carrying out the objects of the invention there is provided a tank gauge which has a fitting attached to a tank in any suitable manner, as by screw threads as shown in the present instance and the fitting may be internally screw-threaded at the top end thereof. A gauge rod passes through the fitting and into the tank and is reciprocal in the fitting. Sealing means are mounted in the fitting with the gauge rod extending through the sealing means in such a manner so that a seal is maintained at all times between the fitting and gauge rod as the gauge rod is reciprocated within the fitting. The gauge rod has a valve associated with the top thereof with said valve being tilted by force to open the valve and closing automatically when the force is removed from the valve. The valve closes off flow from the tank through the gauge rod to the exterior of the tank and has means within the valve to automatically return the valve to closed position with relation to the tank interior and gauge rod when the force is removed from the valve. The valve at the top of the gauge rod may consist of a cap member surrounding the top of the gauge rod with a valve flange within the cap member to form a closure seating on a ledge within the cap member. A spring is also included within the cap member to force the valve flange against the ledge or into closed position within the cap member to close off flow from the tank through the gauge rod. The cap member is tilted by force to unseat the valve flange from the ledge to open the tank through the gauge rod to the exterior of the tank. The spring within the cap member forces the valve flange into seated position on the ledge to close the tank interior and gauge rod to the tank exterior when the tilting force is removed from the cap member. The cap member is attached to the fitting, as by the cap member being externally screw threaded and screwing into the internal threads on the fitting member. When the cap member is attached to the fitting, the tank gauge is held in inoperative position and when said cap member is detached from the fitting, the tank gauge may be reciprocated in the fitting and the cap member may be tilted by force to open the tank to the exterior through the gauge rod. Sealing means are included between the valve flange and ledge; and between the cap member and fitting to seal these members when screwed together. There may be a pin associated with the valve flange which fits into an opening in the cap member to insure that the valve flange will rotate with the cap member. There may also be included a clamp means associated with the fitting and gauge rod to hold the gauge rod in any predetermined position in the fitting and there may be means associated with the cap member and gauge rod to hold the cap member in tilted position or in other words remove the automatic feature from the structure.

With the foregoing and other objects in view, the invention will be more fully described hereinafter and will be particularly pointed out in the claims appended hereto.

In the drawings wherein like symbols refer to like or corresponding parts throughout the several views:

Figure 1 is a part elevational view of a tank with a part of the tank in section to show the tank gauge within the tank in elevation.

Figure 2 is a schematic view of the tank gauge in a tank with the bottom portion above the liquid level.

Figure 3 is a schematic view of a tank gauge in a tank with the tank gauge end at the liquid level in the tank.

Figure 4 is a sectional view taken on the line 4—4 of Figure 1.

Figure 5 is a sectional view of the tank gauge showing the cap member tilted to open the tank interior to the tank exterior through the gauge rod; a clamping means to hold the gauge rod at a predetermined position within the fitting; and a means to hold the cap member in tilted position.

Figure 6 is an elevational view of the means to hold the cap member in tilted position.

Figure 7 is an elevational view of the clamping member to hold the gauge rod in a predetermined position in the fitting.

In Figure 1, a tank for storage of liquified petroleum gas is represented at 1 and a tank gauge at 2 in an inoperative position. Figure 2 shows schematically the tank gauge in operative position and extended above the tank 1. The lower end of the tank gauge is above the liquid level 3 in the tank 1, hence when the tank gauge 2 is opened gas will be discharged giving the operator an indication that the bottom of the tank gauge is above the liquid level. The gauge 2 is moved downwardly slowly until liquid appears from the top of the gauge 2 which gives the operator an indication the lower end of the gauge is in liquid. The amount of the gauge 2 extending above the tank 1 is then measured and from previous calibrations, the amount of liquid in the tank may be determined.

The tank 1 has an enlarged and reinforced opening 4 screw threaded at 5 which screw threaded opening receives a fitting 6. The fitting member 6 is externally screw threaded at 7 on the lower end thereof to attach into the tank 1. The fitting 6 is internally screw threaded at 8 on the upper end thereof. On the lower end of the fitting 6, internally of the screw threads 7 is a counterbore 9 into which a packing assembly is placed to seal the fitting 6 with relation to a gauge rod 10 reciprocal in the fitting 6. The packing consists of two O-rings 11 and 12 made of synthetic rubber unaffected by the liquids which are to be handled, placed in the counterbore 9 with a spacer 13, which may be of brass, between the two O-rings 11 and 12 which spacer forms a groove for each ring 11 and 12. Tests made indicate that the O-rings 11 and 12 will give long trouble free service when run without lubrication and the packing may be termed a lifetime packing that will not need replacing throughout the normal life of the gauge. A slight travel of the O-rings 11 and 12 endwise in the grooves is allowed. This permits the O-rings 11 and 12 to have a slight rolling action in the groove when the gauge rod 10 is moved upwardly or downwardly in the fitting 6. A packing retainer 14 is included at the lower end of the counterbore 9 and the end 15 of the fitting 6 is rolled over to hold the packing assembled in the counterbore 9.

The gauge rod 10 has mounted on the upper end thereof a cap member 16 which cap member 16 has its lower end externally screw threaded at 17. The cap member is screwed into the internal screw threads 8 of fitting 6 to hold the tank gauge 2 in an inoperative position with the bottom end of gauge rod extending into the bottom of the tank. A packing member 18, the same as packing members 11 and 12, is mounted in the opening 19 in the cap member 6 and said packing 18 makes a seal between the fitting 6 and the cap member 16 when these two members are secured together. The gauge rod 10 is expanded at the top thereof as shown at 20 to provide a shoulder. Surrounding the gauge rod 10 and between the shoulder 20 and the top of screw threads 21 on the gauge rod 10 is a valve flange 22. The cap member 16 presents a ledge 23 and the valve flange 22 has a seal member 24, which may be the same O-ring as disclosed at 11 and 12 and 18, which O-ring 24 is held in a groove 25 in the valve flange 22 by having a portion of the valve flange crimped into the O-ring 24. The O-ring packing 24 seats on the ledge 23 to make a seal between the cap member 16 and the exterior of tank 1. Nameplate 26 closes the top of cap member 16. Between nameplate 26 and the valve flange 22 is a coil spring 27 which exerts its pressure to keep the valve flange 22 seated on the ledge 23. The nameplate 26 is assembled by wiping a synthetic liquid sealer in the socket or counterbore in cap member 16 that receives nameplate 26, forcing the nameplate 26 in place against the bottom of the counterbore in cap member 16 and against the action of spring 27 and then forcing a die over the end of cap member 16 to crimp the end inwardly to provide a holding means for the nameplate 26 in the cap member 16. After this, cap member 16 is placed in a rotating machine and the rim of the cap rolled tightly against nameplate 26.

A safety nut 28 is loose-fitted on screw threads 21 on the top of gauge rod 10 and said safety nut 28 can easily be screwed by the fingers against the cap member 16. After gauging is completed, safety nut 28 is screwed upwardly into engagement with the bottom of cap member 16. This is done to prevent opening of the valve flange 22 by a straight downward pressure on the cap member 16 when lowering the gauge into engagement with fitting 6. Figure 4 shows the position of safety nut 28 when the gauge is in inoperative position. The safety nut 28 is screwed up on screw threads 21 against the bottom of the screw threaded section 17 of cap member 16. This pulls the gauge rod 10 downwardly and will not allow the cap member 16 to tip and thus inadvertently opening the tank interior to the tank exterior. When a gauging is to be made, the cap member 16 is unscrewed from fitting 6 and the gauge rod 10 properly adjusted in fitting 6, after which safety nut 28 is backed away from the screw threaded end 17 of cap member 16 and the cap member 16 can be tilted as clearly shown in Figure 5.

A small pin 29 is placed in the side of valve flange 22, which pin loosely engages a hole 30 drilled in the cap member 16 to serve as a key to prevent turning of the cap member 16 with relation to valve flange 22 and consequently in relation to gauge rod 10 and safety nut 28. If the pin 29 is not included, it has been found that when the cap member 16 is screwed into the fitting 6, the rotation of the cap member 16 with relation to the gauge rod 10, loosened the safety nut 28 enough to permit the cap member 16 to be pulled downwardly with relation to gauge rod 10, by the action of the thread 17, so that valve flange 22 is disengaged from ledge 23 sufficiently to allow a small amount of liquid to escape, up past the thread 17 and gasket 24. The temperature drop from the volatilization of this escaping liquid is sufficient to freeze the fingers holding the tank gauge if the liquid is one of the high vapor pressure hydrocarbon components.

On the end of the gauge rod 10 is an orifice 31 (Fig. 5) in a closure member 32 screw threaded to the gauge rod 10. On top of the closure member 32 is a washer 33 with a shock absorber member 34 on the washer. If desired a maximum filling level stop may be included which consists of a piece of steel tube which is cut to such length that when it is slipped on the rod 10 between washer 33 with shock absorber 34 thereon and closure member 32, it will raise the shock absorber 34 on gauge rod 10 to a position where it will act as a stop when the gauge rod 10 is pulled upward to bring the bottom of the orifice 31 to that level which is the maximum level to which the tank is to be filled with the particular liquid being handled. The maximum filling level stop is merely a special tube fitting, not original with applicant, and its use is optional in the present structure. Its use is not recommended by applicant as it is much better to measure the height of the tank gauge rod 10 and hold the level by a rod position retainer, (to be described later). Then if an operator should overfill the tank, he can easily check the amount of overfill.

The gauge rod 10 is cleared almost instantaneous with propane and similar liquids when the liquid-filled rod 10 is pulled above the liquid level in a tank and the valve opened.

The operation is thought to be simple. A tank 1 to be filled to a certain level 3 with liquid is equipped with the tank gauge 2 of the present invention. The gauge rod 10 is set so the orifice 31 is at the exact level it is desired the liquid should reach in the tank 1. When cap member 16 is tilted gas will issue from the tank gauge until the liquid in tank 1 reaches the level of orifice 31 after which liquid will issue from the tank gauge. When liquid issues, the liquid in tank 1 will have reached the desired height. The cap member 16 may be tilted at regular intervals to determine when the liquid has reached the desired height in the tank 1. The force may be applied with the hand to tilt cap member 16 as a steady pressure so as to lift valve flange 22 and O-ring 24 off ledge 23 and thus open gauge rod 10 to the exterior of tank 1. Some operators prefer to strike cap member 16 several times on top with the hand to force the valve open momentarily, which procedure is not advocated. Striking cap member 16 reduces the amount of fluid which escapes and reduces the fire hazard but does not give as accurate a test as the tipping method applied by a steady pressure of the hand.

If the tank 1 already contains liquid, and it is desired to measure the liquid content of tank 1, the tank gauge 2 is moved so the orifice 31 is in the portion of the tank 1 containing gas as in Figure 2. The gauge 2 is then moved downwardly, with cap member 16 tilted to open valve flange 22 and allow escape of gas. When orifice 31 moves into the liquid, liquid starts coming out of the cap member 16 instead of gas, hence the operator is notified that the liquid level has been reached. Downward movement of the tank gauge 2 is stopped and a measurement of the portion of the tank gauge 2 remaining outside the tank is made as in Figure 3 and by previous calibration, the height of liquid in the tank can easily be determined.

It is to be understood, the automatic closing feature of the valve on the top of gauge rod 10 is always to be desired but if an experienced operator is available and wishes to dispense with the automatic feature of the present invention, the structure can be so operated. The operator needs to set the gauge 2 at such height as will indicate the level of the liquid when the tank is filled. A clamping means 35 is shown in Figure 7 to hold the gauge rod 10 positively in the desired setting and may be applied regardless of how the gauge 2 is operated. The clamping means 35 has a lower portion 36 which slips over the fitting 6 and is held back of a shoulder on fitting 6. Another upper portion 37 slips over gauge rod 10. A bolt 38 connects the upper and lower portions 36 and 37 and a spring 39 over bolt 38 keeps the upper and lower portions separated. The upper portion 37 cants and causes a binding action with the gauge rod 10 hence holds it in clamped position. The clamping means 35 is easily removed by just pushing down on upper portion 37 to destroy its binding action and slipping it out. It is to be understood O-rings 11 and 12 have some binding action on gauge rod 10 but not enough to insure the gauge rod 10 having a positive setting.

The experienced operator will also set the valve open at the top of the gauge rod 10 by tilting the cap member 16 and applying a member such as shown at 40 in Figure 6 over cap member 16 and back of lock nut 28 to hold the cap member 16 tilted and hence the valve open. With the valve thus open the operator is free to leave the tank 1 and attend to other matters. If he is an experienced operator, he will not be smoking or carrying a lighted lantern while tank 1 is filling. Members 35 and 40 can easily be carried in the operator's pocket, hence are always handy. When setting the gauge 2, he slips the member 35 into place and adjusts the gauge 2 to its proper height. He then snaps on the member 40 to tilt cap member 16 which allows a stream of vapor to start and goes on to attend his other duties until the vapor turns to liquid indicating that the tank is filled to the proper height. This may be determinable at a glance but usually the trained operator has his ear tuned to the change of sound when gas stops issuing and liquid begins. He immediately shuts off the supply flow to the tank 1, pulls off the member 40 allowing the cap member 16 to assume its normal position and close off flow through the gauge 2.

While the invention has been described in connection with several specific embodiments, it is to be understood that the words which have been used are words of description rather than limitation, and that practice of the invention within the scope of the appended claims may be resorted to without departing from the true scope of the invention in all its aspects.

I claim:

1. In a tank gauge having a fitting attached to the top of a tank, a gauge rod passing through the fitting in sealed relation and into the tank, said gauge rod having a valve flange surrounding the upper end thereof in sealed relation with the gauge rod, the improvement comprising a cap member surrounding the top of the gauge rod with the valve flange within the cap member and seating within the cap member to form a closure between the gauge rod and cap member, a spring within the cap member to force the valve flange into seated position in the cap member to close off flow from the tank through the gauge rod, said cap member being tiltable by force to unseat the valve flange from the cap member to provide an opening between the cap member and tank gauge to open the tank through the gauge rod to the exterior of the tank and said spring within the cap member forcing the valve flange into seated position with the cap member to close the opening between the cap member and gauge rod when the force is removed from the cap member.

2. In a tank gauge having a fitting attached to the top of a tank, a gauge rod passing through the fitting in sealed relation and into the tank, said gauge rod having a valve flange surrounding the upper end thereof in sealed relation with the gauge rod, the improvement comprising a cap member surrounding the top of the gauge rod with the valve flange within the cap member and seating within the cap member to form a closure between the gauge rod and cap member, a spring within the cap member to force the valve flange into seated position in the cap member to close off flow from the tank through the gauge rod, said cap member being tiltable by force to unseat the valve flange from the cap member to provide an opening between the cap member and tank gauge to open the tank through the gauge rod to the exterior of the tank and said cap member attached to the fitting when in inoperable position so that the cap member cannot be tilted.

3. In a tank gauge having a fitting attached to the top of a tank, a gauge rod passing through the fitting in sealed relation and into the tank, said gauge rod having a valve flange surrounding the upper end thereof in sealed relation with the gauge rod, the improvement comprising a cap member surrounding the top of the gauge rod with the valve flange within the cap member and seating within the cap member to form a closure between the gauge rod and cap member, a spring within the cap member to force the valve flange into seated position in the cap member to close off flow from the tank through the gauge rod, said cap member being tiltable by force to unseat the valve flange from the cap member to provide an opening between the cap member and tank gauge to open the tank through the gauge rod to the exterior of the tank and said cap member being externally screw threaded to screw into internal screw threads on the fitting to render the cap member inoperable.

4. In a tank gauge having a fitting attached to the top of a tank, said fitting being internally screw threaded at the top end thereof, a gauge rod passing through the fitting into the tank in sealed relation and reciprocal in the fitting, said gauge rod having a valve flange surrounding the upper end thereof in sealed relation with the gauge rod, the improvement comprising a cap member surrounding the top of the gauge rod with the valve flange seated within the cap member on a ledge in the cap member to form a closure between the gauge rod and cap member, sealing means between the valve flange and the ledge, a spring within the cap member to force the valve flange into seated position on the ledge to close off flow from the tank through the gauge rod, said cap member being externally screw threaded to screw into the internal threads on top of the fitting to hold the fitting and cap member together to render the cap member inoperable, a sealing means between the cap member and fitting to seal the members when screwed together, said cap member when unscrewed being tiltable by force to unseat the valve flange from the ledge in the cap member to provide an opening between the cap member and tank gauge to open the tank through the gauge rod to the exterior of the tank, said spring within the cap member forcing the valve flange into seated position with the ledge in the cap member to close the opening between the cap member and gauge rod when the force is removed from the cap member.

5. In a tank gauge having a fitting attached to the top of a tank, said fitting being internally screw threaded at the top end thereof, a gauge rod passing through the fitting into the tank in sealed relation and reciprocal in the fitting, said gauge rod having a valve flange surrounding the upper end thereof in sealed relation with the gauge rod, the improvement comprising a cap member surrounding the top of the gauge rod with the valve flange seated within the cap member on a ledge in the cap member to form a closure between the gauge rod and cap member, a pin associated with the valve flange fitting into an opening in the cap member, sealing means between the valve flange and the ledge, a spring within the cap member to force the valve flange into seated position on the ledge to close off flow from the tank through the gauge rod, said cap member being externally screw threaded to screw into the internal threads on top of the fitting to hold the fitting and cap member together to render the cap member inoperable, a sealing means between the cap member and fitting to seal the members when screwed together, said cap member when unscrewed being tiltable by force to unseat the valve flange from the ledge in the cap member to provide an opening between the cap member and tank gauge to open the tank through the gauge rod to the exterior of the tank, said spring within the cap member forcing the valve flange into seated position with the ledge in the cap member to close the opening between the cap member and gauge rod when the force is removed from the cap member.

CHESTER FANSHIER.

REFERENCES CITED

The following references are of record in the file of this patent:

UNITED STATES PATENTS

| Number | Name | Date |
|---|---|---|
| 1,372,466 | Whoolery | Mar. 22, 1921 |

FOREIGN PATENTS

| Number | Country | Date |
|---|---|---|
| 7,721 | Great Britain | July 5, 1906 |
| 393,499 | France | Oct. 28, 1908 |